United States Patent
Schwedt et al.

(10) Patent No.: US 10,254,524 B2
(45) Date of Patent: Apr. 9, 2019

(54) MICROSCOPE HAVING LOW DISTORTION ABERRATION

(71) Applicants: Carl Zeiss Microscopy GmbH, Jena (DE); Carl Zeiss AG, Oberkochen (DE)

(72) Inventors: Daniel Schwedt, Weimar (DE); Tiemo Anhut, Jena (DE); Matthias Wald, Jena (DE); Beate Böhme, Broßpürschütz (DE); Tobias Kaufhold, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/526,704

(22) PCT Filed: Nov. 11, 2015

(86) PCT No.: PCT/EP2015/076338
§ 371 (c)(1),
(2) Date: May 12, 2017

(87) PCT Pub. No.: WO2016/075195
PCT Pub. Date: May 19, 2016

(65) Prior Publication Data
US 2017/0315339 A1    Nov. 2, 2017

(30) Foreign Application Priority Data
Nov. 12, 2014 (DE) .................. 10 2014 017 001

(51) Int. Cl.
*G02B 26/08* (2006.01)
*G02B 21/00* (2006.01)
(Continued)

(52) U.S. Cl.
CPC ....... *G02B 21/0032* (2013.01); *G02B 21/002* (2013.01); *G02B 21/0024* (2013.01);
(Continued)

(58) Field of Classification Search
CPC ............ G02B 21/0072; G02B 21/0032; G02B 21/00; G02B 5/10; G02B 26/10
(Continued)

(56) References Cited

U.S. PATENT DOCUMENTS 5,691,839 A * 11/1997 Kobayashi ......... G02B 21/0048
348/E3.053
7,295,726 B1  11/2007 Milanovic et al.
(Continued)

FOREIGN PATENT DOCUMENTS

CH      472037 A     4/1969
DE    3033758 A1    4/1982
(Continued)

OTHER PUBLICATIONS

Corle, et al., "Confocal Scanning Optical Microscopy and Related Imaging Systems," pp. 214, Academic Press, San Diego, (1996).
(Continued)

*Primary Examiner* — Euncha P Cherry
(74) *Attorney, Agent, or Firm* — Alston & Bird LLP (57) ABSTRACT

Beam deflection units in light-scanning microscopes are usually arranged in planes that are conjugate to the objective pupil. The scan optics, which is required for generating the conjugate pupil planes, is complicated and not very light efficient. The invention is intended to enable a higher image quality, simpler adjustment and a lower light loss microscope. The optical system comprises a concave mirror (36) for imaging a respective point of the first and second beam deflection units (30A, 30B) onto one another. The concave mirror (36), the first beam deflection unit (30A), and the second beam deflection unit (30B) are arranged such that the illumination beam path is reflected exactly once at the concave mirror (36). A first distortion caused by the concave mirror (36) and a second distortion of the imaging caused by
(Continued)

the first and second beam deflection units (30A, 30B) at least partly compensate for one another.

20 Claims, 7 Drawing Sheets

(51) Int. Cl.
    *G02B 26/10*     (2006.01)
    *G02B 27/00*     (2006.01)

(52) U.S. Cl.
    CPC ..... *G02B 21/0036* (2013.01); *G02B 21/0048* (2013.01); *G02B 26/10* (2013.01); *G02B 26/105* (2013.01); *G02B 27/0031* (2013.01); *G02B 27/0068* (2013.01)

(58) Field of Classification Search
    USPC ....................................................... 359/208.1
    See application file for complete search history.

(56) References Cited

U.S. PATENT DOCUMENTS 7,787,179 B2     8/2010     Lippert et al.
2003/0230710 A1     12/2003     Wolleschensky et al.
2004/0031930 A1     2/2004     Wolleschensky et al.
2010/0208319 A1     8/2010     Kessler
2013/0107338 A1     5/2013     Richter et al.

FOREIGN PATENT DOCUMENTS

| DE | 69216940 T2 | 9/1997 |
| DE | 102013005927 A1 | 10/2014 |
| WO | WO 1990/000755 A1 | 1/1990 |
| WO | WO 2008/037346 A1 | 4/2008 |
| WO | WO 2015/158861 A1 | 10/2015 |

OTHER PUBLICATIONS

Smith, "Modern Lens Design," Chapter 22, pp. 411-430, McGraw Hill, Boston, (1992).

PCT International Search Report for application PCT/EP2015/076338 dated Feb. 10, 2016.

German Application No. 10 2014 017 001.2, Search Report dated Aug. 27, 2015.

PCT International Preliminary Report on Patentability for application PCT/EP2015/076338 dated May 16, 2017.

\* cited by examiner

Fig. 8

MICROSCOPE HAVING LOW DISTORTION ABERRATION

CROSS-REFERENCE TO RELATED APPLICATIONS

This application is related to and claims priority from the German Application DE20141017001, filed on Nov. 12, 2014, and the International Application No. WO2015EP76338, filed on Nov. 11, 2015, the entire disclosure of which is hereby incorporated by reference.

TECHNICAL FIELD

This application relates to the field of microscopy, and particularly to a low-distortion microscope.

INTRODUCTION

An overview of known arrangements of beam deflection units for scanning light in microscopes is described for example in "Confocal Scanning Optical Microscopy and Related Imaging Systems" by T. R. Corle and G. S. Kino (Academic Press, 1996, page 214). The scan optics is referred to therein as "scan objective" (in a departure from "scan lens", the term that is customary otherwise). It provides a collimated conjugate pupil plane at the location of a beam deflection unit. The combination of scan optics and tube lens is referred to as transfer optics.

Arranging the deflection units in a respective conjugate objective pupil advantageously renders possible the provision of a resting beam cross section in further conjugate pupils. As a result of this, manipulation of the wavefront with high accuracy is possible, for example, as disclosed in Applicants' related applications US 2003/230710 or WO 2008/037346. Moreover, the marginal rays stop down by vignetting at the optics is minimal in their disclosed way.

However, the microscopes described are disadvantageous in that the scan optics, which is required for generating the conjugate pupil plane, is complicated and not light budget efficient since it needs to compensate for different image aberrations, such as image field curvature and transverse chromatic aberrations, to allow a high imaging quality. Moreover, there is little available installation space for the deflection unit due to the small distance between the conjugate pupil plane and the scan optics.

In the above references, microscopes of the type mentioned in the introduction having two toric concave mirrors are known, for example, from the product "BIO-RAD Radiance2100" (under the designation) and WO 90/00755. Major disadvantages thereof are the limited image quality, the high sensitivity of adjustment and the high costs for the manufacture of toric mirrors. A corresponding arrangement with a micro-electromechanical drive of the deflection unit is known from, e.g. US 2013/107338.

The arrangement described in US 2010/0208319 solves this problem only partially and has the disadvantage that the intermediate focus lies on a convex mirror, such that aberrations of this mirror are imaged directly into the sample.

Both solutions mentioned above still have a relatively high light loss from the two concave mirrors or from the double reflection at an individual concave mirror.

SUMMARY

The invention relates to a microscope comprising an optical system which defines an illumination beam path and comprises the following components: a light source, which provides a (spatially delimited) light distribution, a microscope objective comprising a pupil plane and an (object-side) focus, a scan optics for generating a pupil plane conjugate to the pupil plane of the microscope objective, at least two variably adjustable (relative to a respective deflection direction) beam deflection units and a concave mirror for imaging an (at least one) respective point of the first and second beam deflection units onto one another, wherein the optical system images at least one point of the light distribution and a respective point of the focus (of the microscope objective) onto one another, wherein a (planar or at least substantially planar) first intermediate image lies optically between the microscope objective and the scan optics, wherein the second beam deflection unit is arranged in the conjugate pupil plane. The imaging by the concave mirror provides a further conjugate pupil plane, in which the first beam deflection unit is arranged.

Within the meaning of the invention, light is any form of electromagnetic radiation which is manipulable by optical means, in particular, including infrared and ultraviolet radiation. For the purposes of providing the light distribution, the light source may comprise, in particular, an optical waveguide and/or a beam shaper. It may moreover comprise an intensity modulator. The light distribution of the light source may be two-dimensional or three-dimensional, and have different shapes here, for example, an individual punctiform or a linear area, or an individual spherical, or a rod-shaped volume, or a plurality of separate punctiforms or linear areas, or a plurality of similar spherical or rod-shaped volumes. Beam deflection units are also referred to as scanners.

The disclosure describes an optical system which improves an existing microscope of the type mentioned in the introduction, such that a higher image quality, simpler adjustment, and a lower light loss are made possible. Furthermore, in particular configurations, the disclosure enables a lower cost microscope.

The objective is achieved by a microscope that has the features disclosed in the following texts, figures and claims.

According to the invention, it is provided that the concave mirror, the first beam deflection unit, and the second beam deflection unit are arranged such that the illumination beam path is reflected exactly once at the concave mirror; and a first distortion caused by the concave mirror and a second distortion from the imaging at the focus of the light distribution, said second distortion being caused by the first beam deflection unit and the second beam deflection unit, where the first distortion and the second distortion at least partly compensate for one another.

The concave mirror has an achromatic effect. In this manner, a further conjugate pupil plane can be provided with little optical outlay, and in particular, with a small number of interfaces. The mutual compensation of the first and second distortions enables the imaging of the conjugate pupils with the beam deflection units onto one another, virtually without aberrations, using only one imaging element. In the opposite direction, similar effects are achieved with a coupled detection beam path in the microscopic imaging. In this way, a higher image quality of the illumination can be achieved not only cost-effectively, but also with efficient light usage and simple mechanical adjustments. Additional correction optics can largely be dispensed with, which enables simpler adjustments and a lower light loss. Moreover, both conjugate pupils are equally valid. That means that both beam deflection units can be driven with individually definable angular velocities, as a result of which any desired image field angle is adjustable. That is to say that an image field rotation, such as has been possible heretofore in arrangements without imaging, can also continue to be implemented.

In this case, expediently exactly one concave mirror is arranged in the illumination beam path optically between these two beam deflection units. It is particularly advantageous if there is only one concave mirror (but no other optically effective surfaces) is arranged optically between these two beam deflection units. In these embodiments, the light loss is particularly low on account of the small number of optical interfaces.

Preferably, the concave mirror, the first beam deflection unit, and the second beam deflection unit are arranged for compensation of the first and second distortions such that a planar angle of the reflection of an optical axis of the illumination beam path (stationary, coming from the light source) on the first beam deflection unit in a zero position of the first and second beam deflection units has a magnitude double that of a planar angle of reflection of the optical axis at the concave mirror. The two beam deflection units are in the zero position when they direct the optical axis of the stationary illumination beam path coming from the light source, which is coaxial with respect to the optical axis of the microscope objective. In other words: In a coordinate system common to the concave mirror and the first beam deflection unit, the angle between the axis of rotation of the first beam deflection unit and the surface normal of the concave mirror on the principal axis thereof or on the optical axis of the optical system (between the light distribution and the first beam deflection unit) is $90°+\alpha/2$, wherein $\alpha$ is the angle between incident ray and reflected ray at the concave mirror. This configuration enables a particularly extensive mutual compensation of the distortions, since virtually identical field distortions with an opposite sign arise as a result of the imaging by the mirror and as a result of the scan process.

In this case, particular preference is given to embodiments in which a radius of curvature of the concave mirror corresponds (the radius of curvature in the case of a spherical concave mirror) to an optical path length between the concave mirror and the first beam deflection unit and an optical path length between the concave mirror and the second beam deflection unit. This configuration enables a particularly extensive mutual compensation of the distortions and minimal imaging aberrations for arbitrary deflection angles at the first beam deflection unit.

Advantageously, the concave mirror can have a spherical shape and the center of curvature of the concave mirror can lie between the first beam deflection unit and the second beam deflection unit, in particular on a circle arc around the central incidence point of the concave mirror (defined by the position of the optical axis on the concave mirror in the zero position of the first and second beam deflection units) that runs through the incidence points of the optical axis of the optical system on the first and second beam deflection units (in the zero position thereof), in particular in the center of said circle arc. Spherical concave mirrors are available with particularly little expenditure in respect of costs. A maximum distortion compensation is achieved by means of the specific arrangement and alignment.

On account of the oblique incidence of the illumination beam path on the concave mirror, an astigmatism results in the case of a spherical concave mirror. In order to reduce or avoid said astigmatism, the concave mirror can have a toric shape (surface shape of a torus section). Here, the concave mirror preferably has a first radius of curvature, which is smaller than twice the radius of curvature of the intermediate image by a factor cos (angle of incidence), and a second radius of curvature, which is greater than twice the radius of curvature of the intermediate image by the factor cos (angle of incidence). Preferably, the first curvature belonging to the first radius of curvature extends about an axis which is parallel to an axis of rotation of the first beam deflection unit and the curvature belonging to the second radius of curvature extends orthogonal to the first curvature. Less costly are embodiments in which the optical system, in particular in the case where the concave mirror has a spherical shape, has an optics for compensating for astigmatism, for example a cylindrical lens, between the light source and the first beam deflection unit.

In a first of two alternative embodiments, the scan optics images the first intermediate image via the second beam deflection unit (the reflective surface thereof) into a second intermediate image, which is spatially curved, wherein the second intermediate image lies optically between the concave mirror and the second beam deflection unit and the concave mirror is arranged such that it focusses collimated light beams that reach it from the first beam deflection unit into the second intermediate image. That enables a compact arrangement of beam deflection units and scan optics. Preferably by arranging the concave mirror at the distance of the radius of curvature thereof from the first conjugate pupil, it is possible to provide (via a curved second intermediate image) a highly precise image at the same distance, independently of the field angle. In this case, the scan optics is expediently free of an image field curvature correction, such that it is embodied like an eyepiece. That reduces the expenditure in respect of costs for the microscope overall.

Therefore, in contrast to the prior art, the reflecting surface of the deflection unit is no longer arranged in a collimated section of the detection beam path, but in a convergent section instead. The transfer optics is embodied in such a way that a real curved image of the first intermediate image plane would arise if the second beam deflection unit were removed. The spatial curvature of the intermediate image allows the provision of the conjugate pupil plane by means of a scan optics which has been significantly simplified in comparison with conventional, collimating scanning objectives, in particular without correction of the image field curvature, with, nevertheless, the same imaging quality of the overall optical system. In this case, in particular, the (near-field) lenses having negative focal length/refractive power that have been customary heretofore for the purpose of planarizing (W. J. Smith: "Modern Lens design", McGraw-Hill, 1992, chapter 22, page 411) can be omitted. In terms of the optical properties and quality thereof, such a scan optics needs rather to correspond merely to an eyepiece instead of a conventional scanning objective. The radius of curvature of the second intermediate image then preferably corresponds to the distance between the deflection unit and the focal position of the first intermediate image. Additionally, the correction of the transverse chromatic aberration can also be divided among the scan optics and the tube lens within the meaning of a compensation system, meaning a further simplification of the scan optics. Expediently, the microscope can have such an embodiment that the scan optics and the tube lens compensate for one another in respect of the transverse chromatic aberration.

This arrangement is particularly advantageous in the case of a nonlinear interaction of the excitation radiation with the sample. Here, the quadratic dependence on the excitation energy intensity (in the case of the two-photon excitation) or cubic dependence on the excitation energy intensity (in the case of the excitation of the third harmonic or the threephoton excitation) of the light emission from the sample in the conventional arrangement of a plurality of beam deflection units in a respective pupil, when the deflection units are not imaged on one another, leads to problems in the image field illumination. The physical distance of the deflection units upstream of the scan objective will be imaged into the objective pupil with the axial magnification which increases quadratically with the lateral magnification. This leads to a non-stationary pupil, which results in a field-dependent excitation intensity. These problems in nonlinear optics (NLO) can be avoided by arranging the beam deflection unit in a non-collimated pupil since this allows good imaging of the deflection units on one another in a light-efficient arrangement. Typically, the detection of the fluorescence in this case is not brought about by way of the beam deflection unit, but already upstream in the so-called "non-descanned" beam path section. However, since the arrangement is equally effective in the excitation direction as in the detection direction, clean imaging of the pupils is also obtained in this case.

Preferably, the second intermediate image is spherically curved or at least substantially spherically curved, in particular with a radius of curvature between the single focal length and twice the focal length of the scan optics. Preferably, the radius of curvature of the intermediate image is identical to a distance between (a center point of the reflecting surface of) the deflection unit and the second intermediate image.

Preferably, in this first embodiment, the curved second intermediate image lies concentrically around the second beam deflection unit. As a result, in the case of a spherically curved intermediate image, independently of the position of the second beam deflection unit, the focus lies on the spherical surface formed by the intermediate image. In this way, there is no need for any optics for correcting an image field curvature, in particular as part of the scan optics.

Advantageously, a radius of curvature $R_H$ of the concave mirror may be twice the size of a radius of curvature $R_{ZB}$ of the second intermediate image such that plane wavefronts are present downstream of the concave mirror (on the transducer side). In this way, the second conjugate pupil lies in a collimated beam path section and the beam diameters in the two conjugate pupils are the same. Expediently, the concave mirror is then arranged in such a way that rays coming from the focus of the microscope objective (through the second intermediate image) extend parallel to one another downstream of the concave mirror, preferably also parallel to a plane within which the first deflection unit is able to deflect incoming light, and at an angle in relation to a central axis of the concave mirror. The distance A between concave mirror and the curved intermediate image then equals the radius of the intermediate image $R_H$: $R_H = 2 \cdot R_{ZB} = 2 \cdot A$. Thus, in conjunction with the curved second intermediate image, a particularly high imaging quality of the optical system is possible with little outlay. However, there may also be wavefront curvatures differing from zero downstream of the concave mirror if the concave mirror radius of curvature $R_H$ deviates from twice the intermediate image radius $R_{ZB}$ by a difference D. For the concave mirror radius $R_H = 2 \cdot R_{ZB} + D$, the distance A between concave mirror and intermediate image is $A = R_{ZB} + D$. Furthermore, the beam diameters on the first beam deflection unit and on the second beam deflection unit may not be equal, for example, in the case of an imaging scale not equal to 1:1.

However, the radius of curvature $R_H$ of the concave mirror may also deviate from twice the radius of curvature $R_{ZB}$ of the intermediate image. A concave mirror with the radius of curvature $R_H = A$ is arranged, for example, at the distance A/2 from the curved intermediate image such that the light on the optical axis is collimated (when the beam deflection units are in their mid-position).

In the second alternative embodiment, the scan optics collimates light beams from the first intermediate image and subsequently guides them via the second beam deflection unit (the reflective surface thereof) onto the concave mirror, which is arranged such that it focusses light beams collimated in this way into a second intermediate image, which is concentric in particular around the second beam deflection unit and which lies optically between the concave mirror and the first beam deflection unit. This embodiment makes it possible to use the distortion compensation according to the invention with conventional scan optics.

Expediently, the microscope may comprise an illumination optics for imaging the light distribution into an intermediate image, in particular into the second intermediate image or into a third or further intermediate image, and/or a detection optics for imaging an intermediate image, in particular the second intermediate image or a third or further intermediate image, onto an optoelectronic transducer.

In particular, the optical system may comprise a beam splitter which is arranged in the illumination beam path and in the detection beam path in such a way that light coming from the focus is decoupled to the optoelectronic transducer from the illumination beam path.

Expediently, the optical system may comprise a collimation optics (in the illumination beam path or in the detection beam path) on a side of the beam deflection unit distant from the scan optics. In this manner, further manipulations on the beams and the final detection are possible with little outlay.

Expediently, the first beam deflection unit is rotatable such that the optical axis of the illumination beam path is deflectable out of a plane spanned by a direction of incidence of the optical axis on the first beam deflection unit and an optical axis of the microscope objective.

The disclosure also encompasses microscopes comprising a third beam deflection unit, which is movable reversibly into the illumination beam path, and a variably adjustable fourth beam deflection unit. When the third beam deflection unit is situated in the illumination beam path, the path runs from the third beam deflection unit to the fourth beam deflection unit, then comes back to the third beam deflection unit, and then the path continues from the concave mirror to the second beam deflection unit. When the third beam deflection unit is positioned outside the illumination beam path, the path runs, as described above, from the first beam deflection unit, to the concave mirror first and then the second beam deflection unit. In this way, it is possible to change between different scanning modalities with little outlay. The fourth beam deflection unit may be a resonantly oscillating mirror, for example, while the first beam deflection unit is a galvanometer mirror or vice versa. This enables flexible use in research on fixed cells, living cells, cell formations, and small animals, or applications for screening samples. In manipulation experiments such as FRAP, fast switching from manipulation of the sample (bleaching) to imaging at a high image refresh rate is thus made possible, in order to measure the fast rise of the fluorescence signal after the end of the bleaching process. For this purpose, the third beam deflection unit may be variably adjustable with regard to the deflection direction; in addition, it may also have a static orientation. It may be movable into the illumination beam path by a translational and/or rotational movement, for which purpose it may have a corresponding drive.

Preferably, only the first configuration, in which the concave mirror and the second beam deflection unit are incorporated into the illumination beam path, has the distortion compensation according to the invention. The fourth beam deflection unit may comprise for example a mirror operable in resonant oscillation ("resonance scanner"), but a galvanometer mirror may also be involved.

The concave mirror, in particular its reflective surface, has a toric shape (surface shape of a torus section), the invention also encompassing other shapes. As a result, the astigmatism resulting from oblique incidence can be reduced. Here, the concave mirror preferably has a first radius of curvature, which is smaller than twice the radius of curvature of the intermediate image by the factor cos (angle of incidence), and a second radius of curvature, which is greater than twice the radius of curvature of the intermediate image by the factor cos (angle of incidence). Preferably, the first curvature belonging to the first radius of curvature extends about an axis which is parallel to an axis of rotation of the first beam deflection unit and the curvature belonging to the second radius of curvature extends orthogonal to the first curvature.

Configurations in which some, or all, of the scan optics is displaceable along an optical axis of the illumination beam path are particularly preferred. In particular, they may comprise an electric drive for displacing the displaceable part of, or the entire, scan optics. As a result of the axial displacement, the position (the distance) of the conjugate pupil relative to the second deflection unit is able to be set with little outlay, whereas, previously, the position of the scan optics was only set and fixed once on the beam deflection unit for adjusting the focal position and hence for adjusting the collimation. As a result of this, it is possible, in particular, to compensate for a pupil shift, which occurs e.g. when interchanging the microscope objective. Here, the axial position of the conjugate pupil varies with the square of the imaging scale between first deflection unit and objective pupil. Here, the focal position in the intermediate image plane, and hence also in the object plane, is largely maintained.

Preferably, the scan optics is embodied in such a way that the imaging thereof (from the first intermediate image into the second intermediate image) has a magnification factor of between 0.8 and 1.2, in particular of between 0.9 and 1.1, in particular of exactly 1. In this way, the position of the first intermediate image, and hence the sample-side focal plane, remains constant with a high accuracy. The focus is maintained best in the case of 1:1 imaging of the scan optics from the virtual object to the first intermediate image (parabolic extent of the focal offset).

Embodiments in which the microscope objective is arranged in a manner displaceable along the optical axis and/or in an objective changer, in particular comprising an electric drive for displacing the microscope objective and/or for interchanging the microscope objective, are advantageous. As a result, great flexibility when measuring with an unchanging high imaging quality is rendered possible in conjunction with the adaptability to the different pupil positions of different objectives.

Preferably, the first beam deflection unit and/or the second beam deflection unit have/has a micro-electromechanical system for setting the beam deflection. Like in U.S. Pat. No. 7,295,726 B1, this may provide rotatability about two different axes, in particular with the position of the (stationary) point of intersection of these axes in a reflecting surface (deflecting the beam coming from the scan optics), in particular with the arrangement of this point of intersection on the optical axis of the detection beam path. MEMS-based scanners have a significantly lower mirror mass and, as a result thereof, have the advantage of being able to be tilted quickly in any way and with high accuracy. By way of example, one of the beam deflection units may be a MEMS-based mirror which is only adjustable about exactly one axis of rotation and the other beam deflection unit may be a galvanometric scanner. Here, the galvanometric scanner may also be operated resonantly.

Expediently, the light source is a laser. By way of example, it may be a tunable laser.

The optical system may advantageously comprise a relay optics for generating a further (third) conjugate pupil plane. Means for generating a predefined and preferably variable pupil distribution of the light may be arranged in said optics. As a result, modifications in amplitude and/or phase can be relayed into the pupil plane of the microscope objective. Alternatively, the optical system may comprise means for generating a field distribution in a Fourier-transformed plane which is able to be relayed via the imaging arrangement of the concave mirror and the first and second beam deflection units into the sample. Relative to the intermediate image, large values of up to approximately ⅓ of the nominal image field size in the non-corrected intermediate image between scan optics and tube optics are possible here. Such means make it possible to relay not only 1 to N separate light beams but also other 1-dimensional or 2-dimensional light distributions such as images or excitation patterns into the sample.

In preferred embodiments, a variably adjustable wavefront modulator is arranged in a further (third) conjugate pupil plane, for example as in WO 2008/037346 A1. Phase manipulations of the illumination beam can thus be performed, since the luminous spot is stationary in the pupil plane during the scanning process. By way of example, an adjustment of the sample-side focal plane along the optical axis (in the z-direction) and hence scanning of a sample in the depth is possible by means of the wavefront modulator within the maximum modulation swing provided thereby. In conjunction with a two-dimensionally variable first beam deflection unit, this enables a three-dimensional displacement of the measurement location and hence three-dimensional scanning of the sample.

As an alternative to the displacement of the focus along the optical axis, a spatially resolved adjustable wavefront modulator may also be used to compensate for location-dependent imaging aberrations, which e.g. arise from local variations of one or more sample properties. To this end, the microscope may comprise a control unit which records at least one image of a sample and establishes manipulated variables for the wavefront modulator (and sets the wavefront modulator accordingly) on the basis of at least one predetermined property of the sample which influences the image, in particular an actual distribution of a property in the sample, and on the basis of the image. In particular, the control unit can establish a measured distribution of the sample property on the basis of the image and establish the manipulated variables in such a way that a deviation between the measured distribution and the actual distribution is minimal, for example by means of curve fitting.

Preferably, an axis of rotation of the first beam deflection unit (30A) is orthogonal or at least approximately orthogonal to an axis of rotation of the second beam deflection unit (30B).

The microscope is preferably a light-scanning microscope, in particular a confocal light-scanning microscope, or a light sheet microscope, for example as described in U.S. Pat. No. 7,787,179. Both in the case of a light-scanning microscope and in the case of a light sheet microscope, the detection beam path can run through the same microscope objective, for example with separation from the illumination beam path by means of a beam splitter, or through a separate detection objective.

The invention is explained in more detail below on the basis of exemplary embodiments.

DETAILED DESCRIPTION

In all of the drawings, parts that coincide bear the same reference signs.

Figure 1:
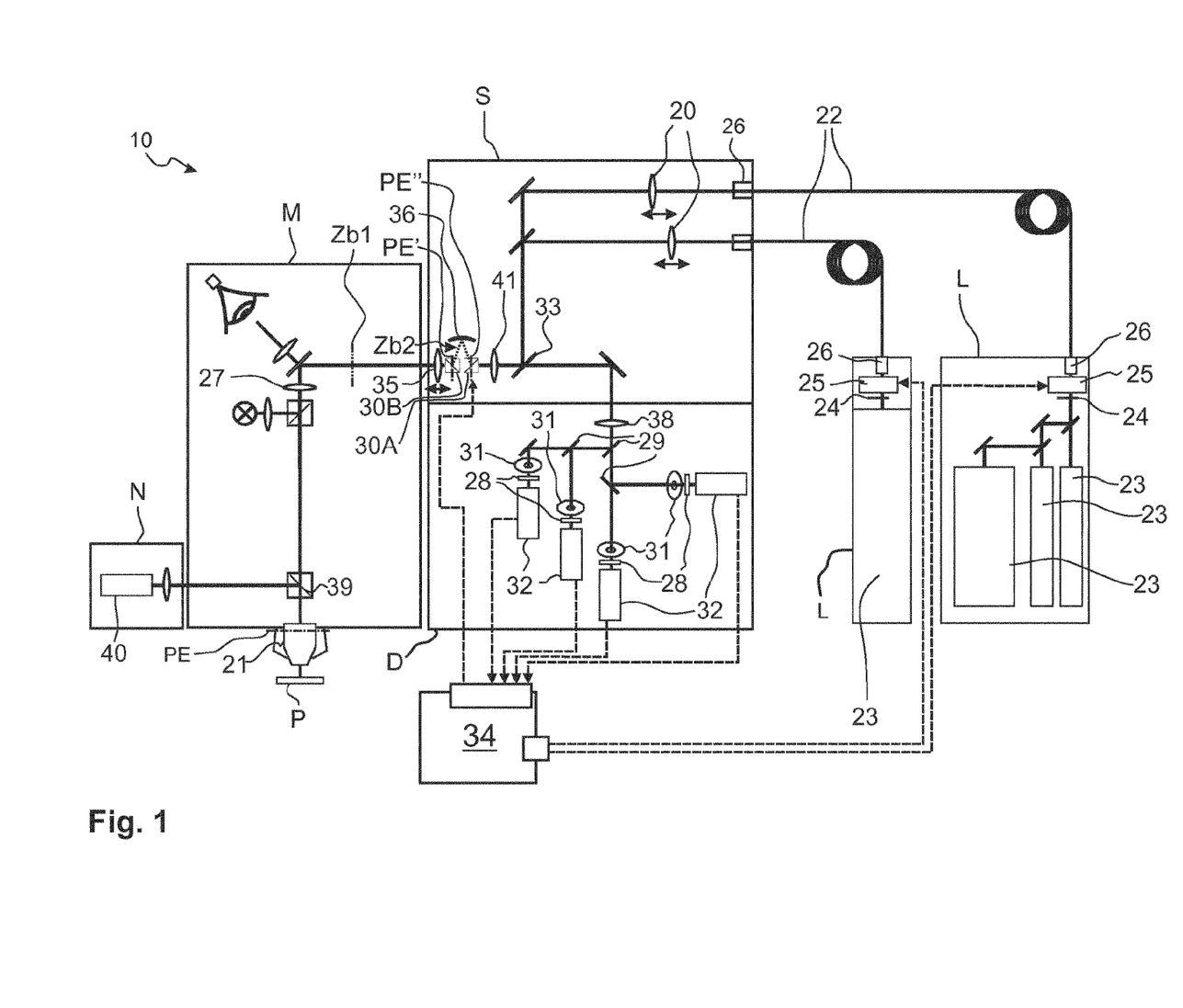
FIG. 1 shows a light-scanning microscope with transfer optics according to the invention.

FIG. 1 is a schematic illustration of a light-scanning microscope 10 ("LSM") which is controlled by means of a control unit 34. The LSM 10 is put together in a modular manner from two illumination modules L with lasers 23, a scanning module S, a detection module D and the microscope unit M with the microscope objective 21. The microscope unit M comprises e.g. an objective revolver for swivelling in different microscope objectives 21.

The light from the lasers 23 can be influenced by light doors 24 and attenuators 25, for example embodied as AOTF, by way of the control unit 34 before it is fed into, and unified in, the scanning unit S by way of optical fibers 22 and coupling optics 20, for example in the form of collimation optics. The combination of each laser 23 with the optics up to the respective optical fiber 22 can be considered to be a respective light source, which provides a confocal, punctiform light distribution, which is imaged into the sample P along an illumination beam path, at the end of the relevant optical fiber 22. The excitation light from laser 23 then passes the principal beam splitter 33, a weak cylindrical optics 41, a first beam deflection unit 30A, which is variably adjustable in the X-direction, for example the spherical concave mirror 36; and the second beam deflection unit 30B, which is variably adjustable in the Y-direction (orthogonally to the X-direction). Finally, the excitation light passes to the microscope objective 21, which focusses the light into the sample P at the measurement location.

The concave mirror 36 images the two beam deflection units 30A and 30B onto one another. The concave mirror 36 and the beam deflection units 30A, 30B are arranged such that the illumination beam path is reflected exactly once at the concave mirror 36. A first distortion, caused by the concave mirror 36, and a second distortion of the imaging, said second distortion being caused by the first and second beam deflection units 30A, 30B, compensate for one another. The cylindrical optics 41 compensates for the astigmatism that arises as a result of the off-axis incidence on the concave mirror 36.

Excitation light backscattered from the sample P and emitted fluorescence light pass through the microscope objective 21, the tube lens 27, and the scan optics 35 via the beam deflection units 30A and 30B and also the concave mirror 36, through the cylindrical optics 41 and the principal beam splitter 33 into the detection module D.

The microscope objective 21 has an infinite back focal length such that a collimated beam path is present up to the tube lens 27. Situated within the microscope objective 21 is the (exit) pupil plane PE thereof. The tube optics 27 generates a first intermediate image Zb1, which is imaged into a second intermediate image Zb2 by the scan optics 35. As a result, the second beam deflection unit 30B lies in a convergent section of the detection beam path. In this case, a pupil plane PE' conjugate to the pupil plane PE lies on the second beam deflection unit 30B. The first beam deflection unit 30A is rotatable such that the optical axis of the illumination beam path is deflectable out of a plane spanned by a direction of incidence of the optical axis on the first beam deflection unit 30A and an optical axis of the microscope objective.

Subsequently, the concave mirror 36 images the second intermediate image Zb2 to infinity such that only collimated beams are present at the principal beam splitter 33. In alternative embodiments (not depicted here), convergent or divergent beams may be present at the principal beam splitter 33. The coupling optics 20 in the scanning module S and the detection optics 29 should then be adapted appropriately.

By way of example, the scan optics 35 is displaceable along the optical axis of the unified detection and illumination beam path by means of a drive. As a result of this, the position of the conjugate pupil plane PE' can be kept axially on the beam deflection unit 30, even in the case of a change in the pupil plane PE in the case of an interchange, or an axial displacement, of the microscope objective 21.

For the purposes of the fluorescence detection, the principal beam splitter 33 may be embodied e.g. as a dichroic beam splitter ("principal color splitter") such that the backscattered excitation light is mirrored out in the direction of the lasers 23.

Downstream of a detection optics 38, for example a converging lens, the detection module D comprises a plurality of detection channels, each with a pinhole 31, a filter 28 and a photomultiplier 32 as an optoelectronic transducer, which are spectrally separated by color splitters 29 ("secondary color splitters"). It is also possible to use slot diaphragms (not depicted here) instead of the pinholes 31, for example in the case of a line-shaped illumination. The detection optics 38 focuses the previously collimated beams onto the confocal pinholes 31. The confocal pinholes or slot diaphragms 31 serve to discriminate sample light which does not originate from the focal volume at the measurement location. Therefore, the photomultipliers 32 only detect light from the focal volume and thus define the measurement location in the sample P, from which light is recorded and detected at the detection location by the respective light-sensitive layer of the photomultipliers 32. Alternatively, it is also possible to use other light-sensitive sensors known from the prior art, such as avalanche diodes.

The measurement volume of the sample P, which is recorded and illuminated confocally, can be scanned over the sample P by rotating the beam deflection units 30A and 30B in a targeted manner to record a pixel-by-pixel image. These movements and the switching on/off of the illumination by means of the light doors 24 or the attenuators 25 are controlled directly by the control unit 34. Recording data from the photomultipliers 32 is likewise effected by the control unit 34.

A module N ("NLO detection module") for detecting fluorescence after the nonlinear interaction in the case of the excitation is connected to an additional output provided by a beam splitter 39 (also referred to as "NLO beam splitter"). It is possible to connect the NLO detection module N and use the latter for the measurement as an alternative, or in addition, to the detection module D. In alternative embodiments (not depicted here), an independent NLO detection module with a dedicated microscope objective may be arranged on the opposite side of the sample, and used for the detection, as an alternative, or in addition, to the NLO detection module N.

Figure 2:
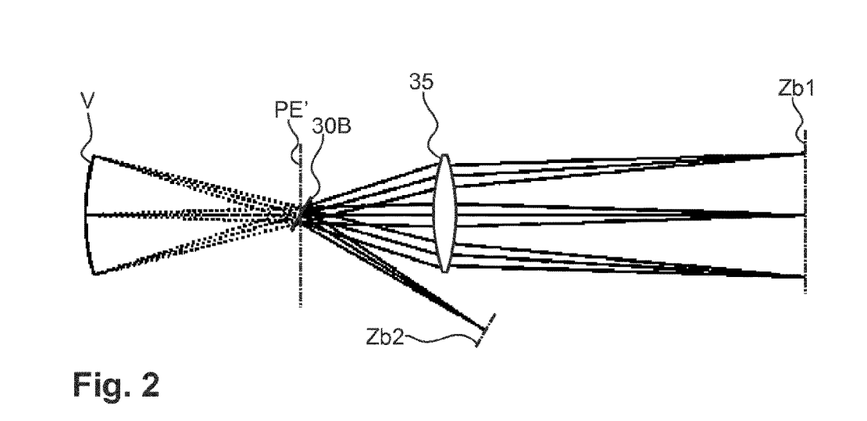
FIG. 2 and FIG. 3 show details of the transfer optics.

FIG. 2 depicts the beam paths around the scan optics 35, which replaces a conventional, complicated scan objective by virtue of imaging the first intermediate image Zb1 into a spatially curved second intermediate image Zb2, in detail for three different positions of the beam deflection unit 30. The scan optics 35 is for example free of an image field curvature correction and has an imaging scale of 1:1. With reference to the lines depicted in an interrupted fashion, it can be discerned that the scan optics is embodied such that a real curved image of the first intermediate image plane would have arisen if the second beam deflection unit 30B were removed. Instead, the second intermediate image Zb2 is spatially curved with the second beam deflection unit 30B arranged in the conjugate pupil PE'.

Figure 3:
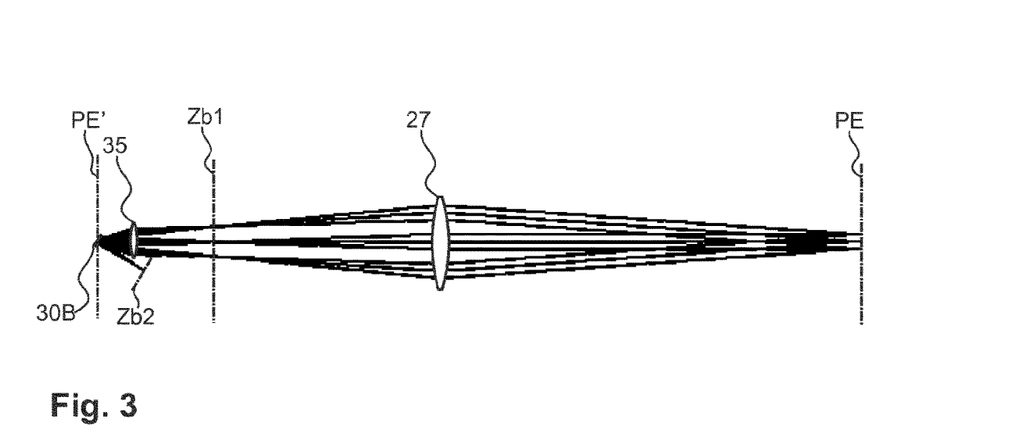

FIG. 3 shows an extended part of the transfer optics, which also comprises a tube optics 27 besides the scan optics 35, the concave mirror 36 (not illustrated here) and the beam deflection units 30A (not illustrated here) and 30B from FIG. 2. The beam paths from the actual pupil plane PE of the microscope objective (not depicted here) to the second intermediate image Zb2 are once again depicted for three different positions of the second deflection unit 30B. The tube optics 27 focuses the collimated beams coming from the pupil PE into the first intermediate image Zb1, which is imaged by the scan optics 35 into the spatially curved second intermediate image Zb2 via the second beam deflection unit 30B, which is arranged in the conjugate pupil PE'.

Figure 4A:
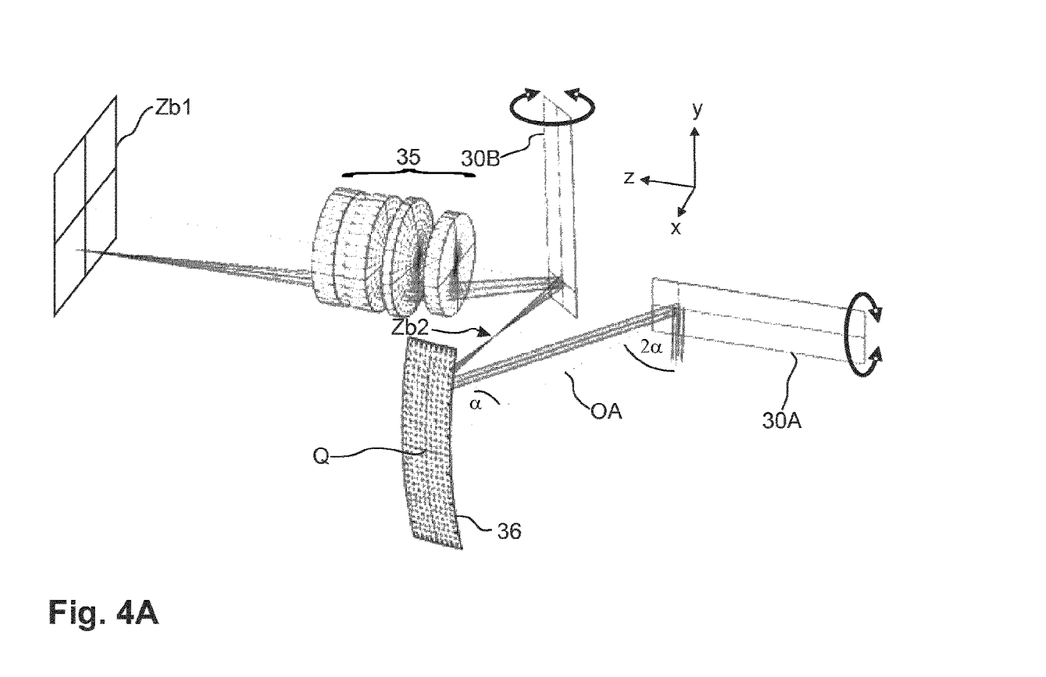
FIGS. 4A and 4B show the angular conditions within the transfer optics.
Figure 4B:
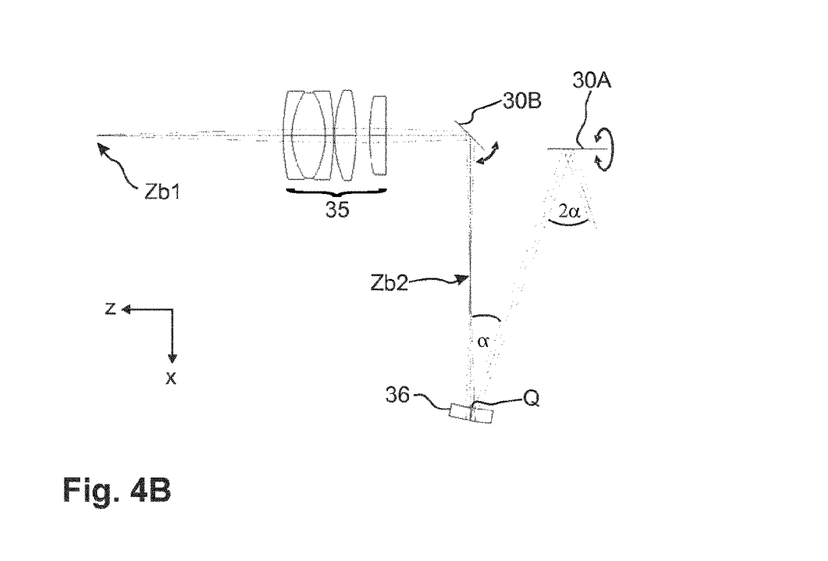

FIGS. 4A and 4B illustrate the beam deflection units 30A and 30B and also the scan optics 35 and the concave mirror 36 in two different schematic views (pseudo-perspective view in FIG. 4A and plan view in FIG. 4B). The concave mirror has a spherical shape. Its center of curvature lies on a circle around the central incidence point Q (exit point of the principal axis) of the concave mirror 36, which contains the two incidence points of the optical axis on the axes of rotation of the two beam deflection units 30A and 30B (in the zero position thereof). In this case, the center of curvature bisects the circle arc between the incidence points on the two axes of rotation.

The concave mirror 36 and the beam deflection units 30A, 30B are arranged such that the planar angle of reflection of the optical axis OA of the illumination beam path on the first beam deflection unit 30A, when the first beam deflection unit 30A and of the second beam deflection unit 30B are at zero positions, has double the magnitude of the planar angle of reflection of the optical axis OA at the concave mirror 36. The angle between the axis of rotation of the first beam deflection unit 30A and the surface normal of the concave mirror 36 at the central incidence point (Q) thereof on the optical axis of the system when the beam deflection units 30A and 30B are in the zero position is $90°+0.5\alpha$.

The second intermediate image Zb2 lies concentrically around the second beam deflection unit 30B. In addition, the radius of curvature of the concave mirror 36 corresponds to an optical path length between the concave mirror 36 and the first beam deflection unit 30A and an optical path length between the concave mirror 36 and the second beam deflection unit 30B. As a result, the image distortions from the concave mirror 36 and the two beam deflection units 30A, 30B compensate for one another to the maximum possible extent.

Figure 5A:
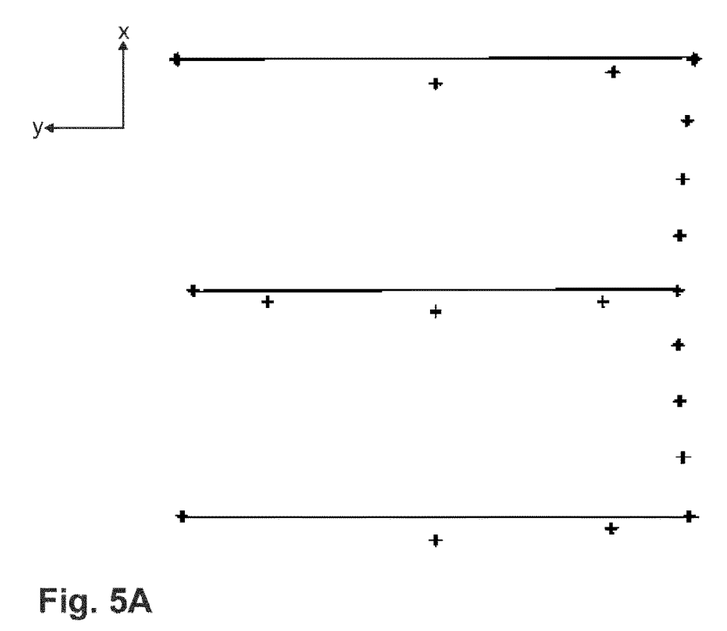
FIGS. 5A and 5B show the concave mirror distortion to be compensated for and the effect of the compensation.
Figure 5B:
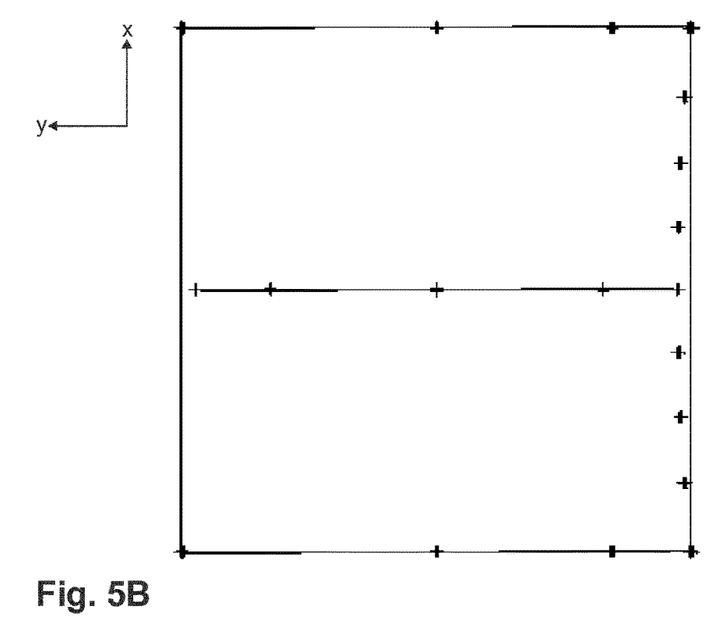

The distortion from the concave mirror 36 and its compensation are evident for the exemplary case of a toric concave mirror 36 from FIGS. 5A and 5B. In an overdrawn illustration, FIG. 5A shows the concave mirror distortion (deviation of the crosses ("+") from the lines parallel to the y-direction), and FIG. 5B shows the residual distortion in association with the arrangement according to the disclosure of the beam deflection units in such a way that the angle of reflection at the first beam deflection unit 30A has a magnitude double that of the angle of reflection at the concave mirror 36.

Figure 6A:
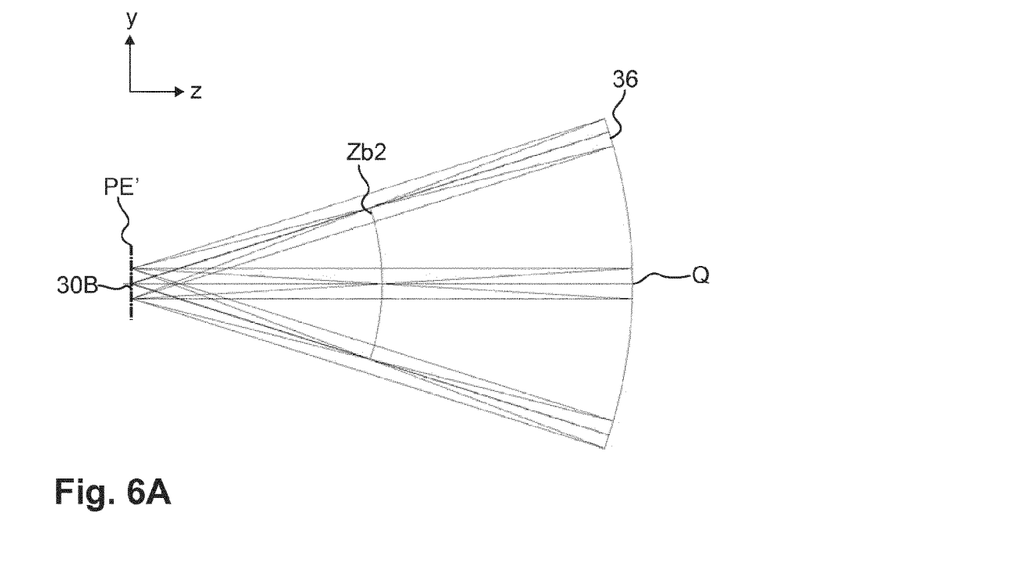
FIGS. 6A-6C show further details of the transfer optics.
Figure 6B:
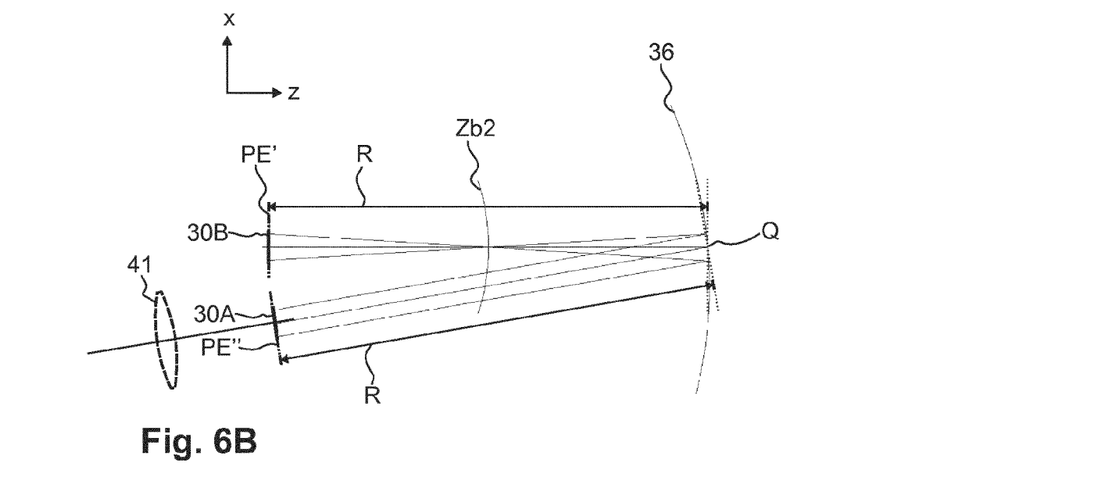
Figure 6C:
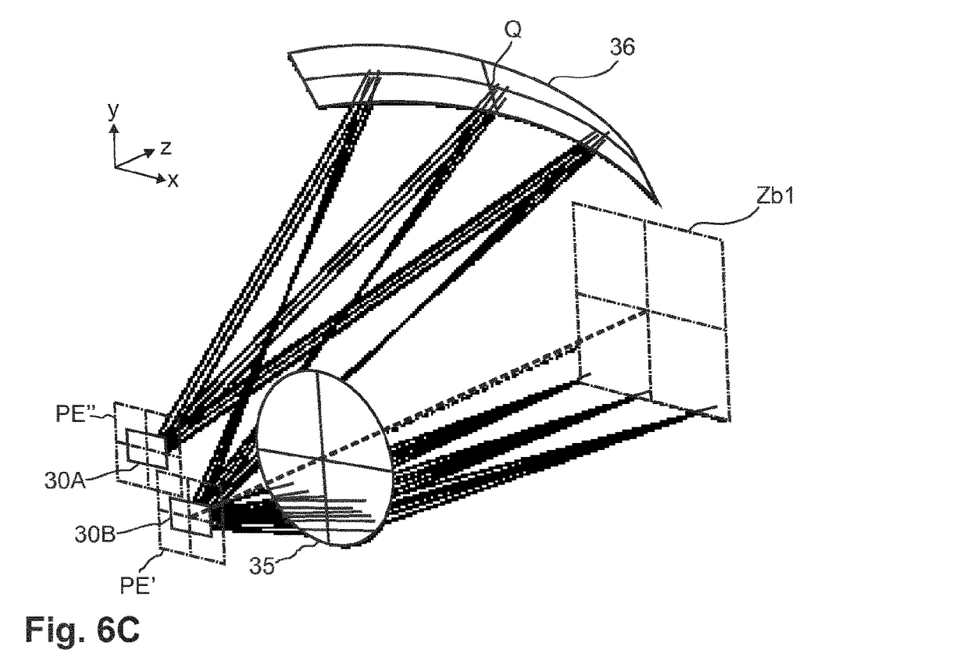

FIGS. 6A and 6B illustrate the complete transfer optics in three different views (FIGS. 6A, 6B, 6C). Said transfer optics replaces e.g. the a focal relay optics according to Kessler, known from the literature, as described in e.g. US 2010/0208319 A1 or WO 90/00755 A1.

By way of example, the second beam deflection unit 30B is a single mirror with a MEMS drive, which is rotatable about two mutually orthogonal, stationary axes. One of these two axes of rotation is parallel to the y-axis. The stationary point of rotation of the mirror lies in the reflecting surface of the mirror on the optical axis of the transfer optics 35. By way of example, the first beam deflection unit 30A is a single mirror with a galvanometric drive, i.e. it has only exactly one axis of rotation, which lies in the x-z-plane. By way of example, it can be operated in resonant oscillation. Alternatively, it is also possible to insert galvanometric beam deflection units, of which one can move the light in the sample in the x-direction and the other one can move it in the y-direction, into both conjugate pupil planes PE' and PE".

The additional pupil plane PE" is provided by the e.g. toric concave mirror which is arranged optically between the first beam deflection unit 30A and the second beam deflection unit 30B. The first center of curvature of the concave mirror 36 lies at the distance of the first conjugate pupil plane PE' on the reflecting surface of the first beam deflection unit 30A (distance R between concave mirror and conjugate pupil PE') and the associated radius of curvature of the concave mirror is twice the size of the radius of curvature of the second intermediate image Zb2. As a result, firstly, there is a perfect, plane image of the first conjugate pupil PE' (at the identical distance R) in the second conjugate pupil PE", independently of the respective field angle, and, secondly, the rays in the second conjugate pupil PE" are collimated in such a way that plane wavefronts are present there. As a result, handling the rays in the further course of the detection beam path is simple. In alternative embodiments (not depicted here), the radii of curvature of concave mirror and second intermediate image may deviate from one another such that non-planar wavefronts are present in the second pupil PE".

Since, with normal incidence, the concave mirror 36 would image the first conjugate pupil PE' onto itself, it is rotated perpendicularly to the plane in which the second beam deflection unit 30B acts, about an axis parallel to y through the central incidence point of the concave mirror, as defined above. As a result of the oblique incidence onto the concave mirror, the latter generates astigmatism, which is maximally compensated for by the toric shape. For this purpose, the radius of curvature along the y-axis is reduced in relation to the radius of curvature of the second intermediate image Zb2 by the factor cos (angle of incidence) and the radius of curvature along the x-axis is increased in relation to the radius of curvature of the second intermediate image Zb2 by the same factor. An additional cylindrical optics is not required here.

As an alternative to the toric shape, the concave mirror 36 may have a spherical shape, in which the first and second centers of curvature, and thus also the corresponding radii of curvature, are identical. Then, a cylindrical optics 41, for example, in the form of a weak cylindrical lens, may be arranged on the side of the concave mirror 36 distant from the scan optics 35 for the purposes of compensating for the astigmatism resulting from the oblique incidence on the concave mirror 36. Preferably, the cylindrical optics 41 may be arranged on the side of the first beam deflection unit 30A distant from the scan optics 35, i.e. in the so-called "descanned" beam path section. The center of curvature of the concave mirror 36 lies in the center of a circle arc around the central incidence point of the concave mirror 36, which comprises the incidence points of the optical axis on the first and second beam deflection units 30A and 30B in the zero position thereof.

Figure 7:
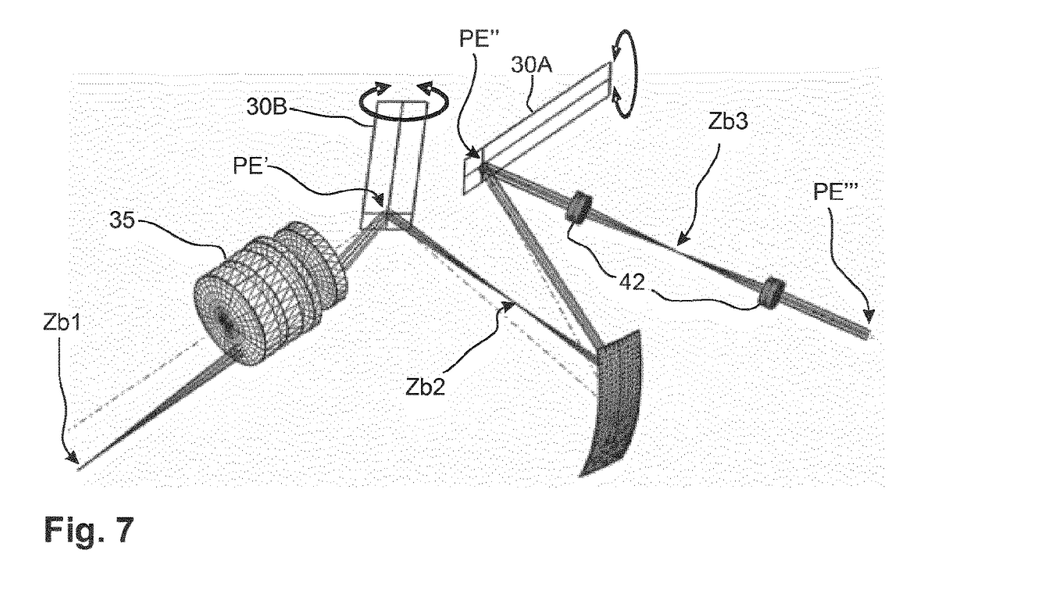
FIG. 7 shows an extended transfer optics with a third conjugate pupil.

FIG. 7 shows, in a slightly rotated illustration corresponding to FIG. 4A, an excerpt from a transfer optics extended by a relay optics 42. The relay optics 42 serves to provide a third conjugate pupil plane PE'''. By way of example, a variably adjustable wavefront modulator (not illustrated) may be arranged therein.

Figure 8:
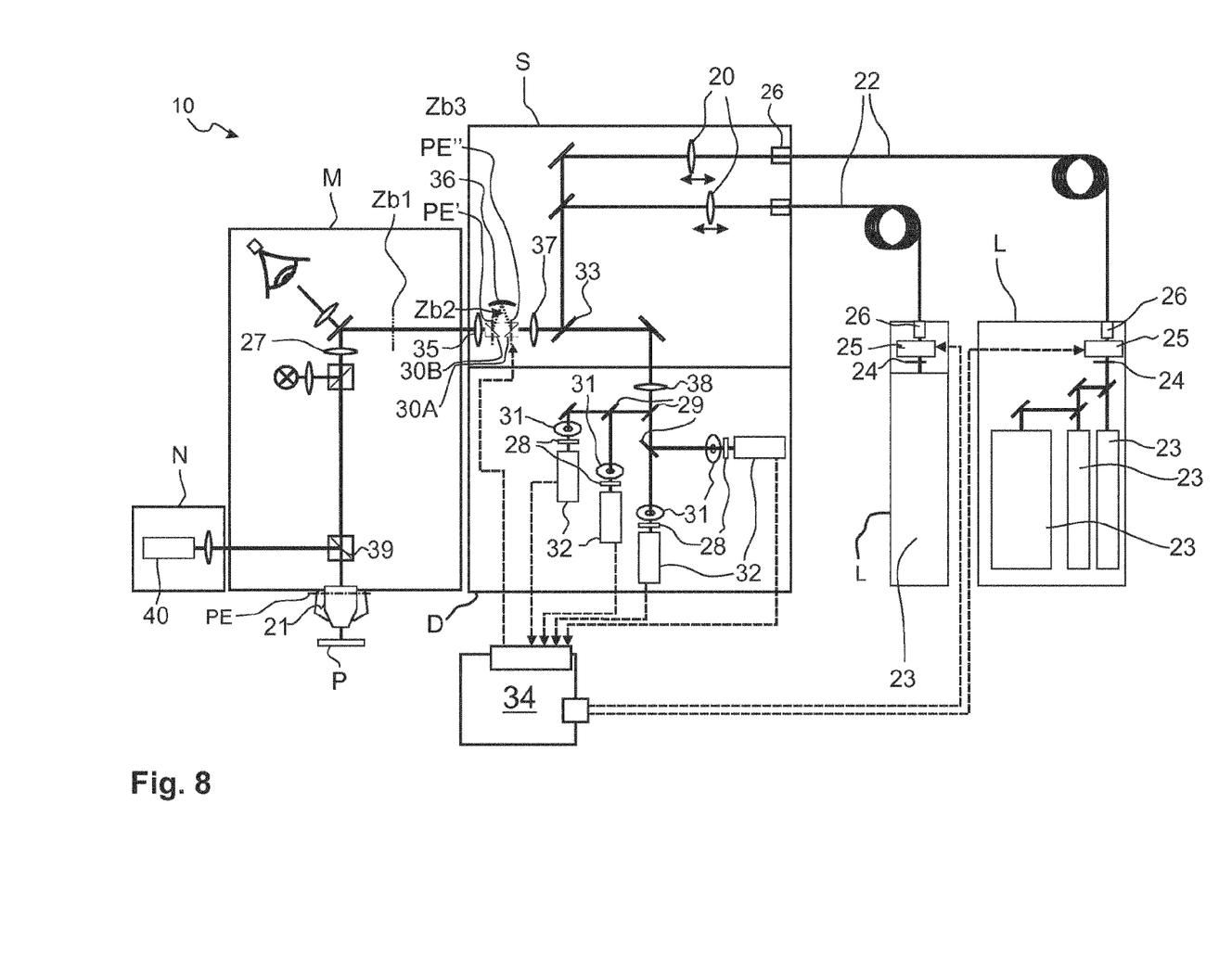
FIG. 8 shows an alternative light-scanning microscope with conventional scan optics.

Finally, FIG. 8 shows a light-scanning microscope 10, which largely corresponds to that illustrated in FIG. 1. However, the transfer optics is present in an alternative embodiment. The scan optics 35 images the first intermediate image Zb1 to infinity in a conventional way with image field curvature correction. The illumination beam path is thereby collimated in the region of the first conjugate pupil PE', in which the second beam deflection unit 30B is arranged. The concave mirror 36 focusses it into the second intermediate image Zb2, which in this embodiment lies between the concave mirror 36 and the first beam deflection unit 30A and is planar. The concave mirror 36 images the two beam deflection units 30A and 30B onto one another, as in FIG. 1.

A collimation optics 37 then images the second intermediate image Zb2 to infinity via the principal beam splitter 33.

The concave mirror has a spherical shape. Its center of curvature lies in the center of a circle arc around the central incidence point of the concave mirror 36, which comprises the incidence points of the optical axis on the first and second beam deflection units 30A and 30B in the zero position thereof.

The concave mirror 36 and the beam deflection units 30A, 30B are in turn arranged such that the planar angle of reflection of the optical axis OA of the illumination beam path on the first beam deflection unit 30A in a zero position of the first and second beam deflection units 30A, 30B has a magnitude double that of the planar angle of reflection of the optical axis OA at the concave mirror 36. In addition, the radius of curvature of the concave mirror 36 corresponds to an optical path length between the concave mirror 36 and the first beam deflection unit 30A and an optical path length between the concave mirror 36 and the second beam deflection unit 30B. As a result, the light distortions from the concave mirror 36 and the two beam deflection units 30A, 30B compensate for one another to the maximum possible extent.

LIST OF REFERENCE SIGNS

10 Light-scanning microscope
20 Coupling optics
21 Microscope objective
22 Optical fiber
23 Laser
24 Light door
25 Attenuator
26 Fiber coupler
27 Tube lens
28 Filter
29 Color splitter
30 A/B/C First/Second/Third beam deflection unit
31 Stop
32 Photomultiplier
33 Principal beam splitter
34 Control unit
35 Scan optics
36 Concave mirror
37 Collimation optics
38 Detection optics
39 NLO beam splitter
40 NLO detector
41 Cylindrical optics
42 Relay optics
D Detection module
L Illumination module
M Microscope unit
N NLO detection module
P Sample
PE('/''/''') (Conjugate) pupil plane
R Distance
S Scan module
V Virtual object
Zb1/2 Intermediate image plane

The invention claimed is:

1. A microscope comprising an optical system which defines an illumination beam path, wherein the optical system comprises:
 a light source configured to provide a light distribution;
 a microscope objective comprising a first pupil plane (PE) and a focus;
 a scan optics for generating a second pupil plane (PE') conjugate to the first pupil plane (PE) of the microscope objective;
 at least a first adjustable beam deflection unit and a second adjustable beam deflection unit;
 a concave mirror for imaging a respective point of the first and second beam deflection units onto one another, wherein the optical system is configured to image at least one point of the light distribution and a respective point of the focus onto one another, wherein a first intermediate image lies optically between the microscope objective and the scan optics, wherein the second beam deflection unit is arranged in the second conjugate pupil plane (PE'), and wherein the concave mirror, the first beam deflection unit, and the second beam deflection unit are arranged such that the illumination beam path is reflected exactly once at the concave mirror, and a first distortion is caused by the concave mirror, and a second distortion is caused by the first and second beam deflection units, wherein the first distortion and the second distortion at least partly compensate for one another.

2. The microscope of claim 1, wherein the concave mirror is arranged in the illumination beam path optically between the first beam deflection unit and the second beam deflection unit.

3. The microscope of claim 1, wherein the concave mirror and the first beam deflection unit and the second beam deflection unit are arranged for compensation of the first and second distortions such that a planar angle of reflection of an optical axis (OA) of the illumination beam path on the first beam deflection unit has a magnitude double that of a planar angle of reflection of the optical axis (OA) at the concave mirror in a zero position of the first and second beam deflection units.

4. The microscope of claim 1, wherein a radius of curvature of the concave mirror corresponds to an optical path length between the concave mirror and the first beam deflection unit and an optical path length between the concave mirror and the second beam deflection unit.

5. The microscope of claim 4, wherein the concave mirror has a spherical shape, wherein a center of curvature of the concave mirror lies between the first beam deflection unit and the second beam deflection unit.

6. The microscope of claim 1, wherein the optical system comprises optics, configured to compensate for astigmatism, between the light source and the first beam deflection unit.

7. The microscope of claim 1, wherein the scan optics are configured to image the first intermediate image (Zb1) via the second beam deflection unit into a second intermediate image (Zb2), wherein the second intermediate image (Zb2) is spatially curved and lies optically between the concave mirror and the second beam deflection unit, and wherein the concave mirror is arranged such that it focuses collimated light beams that reach it from the first beam deflection unit into the second intermediate image (Zb2).

8. The microscope of claim 7, wherein the second intermediate image (Zb2) lies concentrically around the second beam deflection unit.

9. The microscope of claim 1, wherein the scan optics collimates light beams from the first intermediate image (Zb1) and subsequently guides them via the second beam deflection unit onto the concave mirror, which is arranged such that it focuses light beams collimated in this way into a second intermediate image (Zb2), which is concentric around the second beam deflection unit and which lies optically between the concave mirror and the first beam deflection unit.

10. The microscope of claim 1, wherein the first beam deflection unit is rotatable such that the optical axis (OA) of the illumination beam path is deflectable out of a plane spanned by a direction of incidence of the optical axis (OA) on the first beam deflection unit and an optical axis (OA') of the microscope objective.

11. The microscope of claim 1, further comprising:
a third beam deflection unit, which is configured to move reversibly into and out of the illumination beam path; and
a variably adjustable fourth beam deflection unit, wherein, when the third beam deflection unit is situated in the illumination beam path, the path runs from the third beam deflection unit to the fourth beam deflection unit, back to the third beam deflection unit, and then, via the concave mirror, to the second beam deflection unit.

12. The microscope of claim 1, wherein the optical system further comprises a relay optics for generating a further conjugate pupil plane.

13. The microscope of claim 1, wherein an axis of rotation of the first beam deflection unit is orthogonal or at least approximately orthogonal to an axis of rotation of the second beam deflection unit.

14. The microscope of claim 1 comprising exactly one concave mirror.

15. The microscope of claim 5, wherein a center of curvature of the concave mirror lies between the first beam deflection unit and the second beam deflection unit on a circle arc around a central incidence point of the concave mirror that runs through the incidence points of the optical axis of the optical system on the first and second beam deflection units in the center of said circle arc.

16. The microscope of claim 6, wherein the optics comprise a cylindrical lens.

17. The microscope of claim 12, wherein the relay optics is configured to generate a predefined and/or variable pupil distribution of the light.

18. The microscope of claim 12, wherein the relay optics is configured to generate a predefined and/or variable field distribution in a Fourier-transformed plane.

19. The microscope of claim 12, wherein the relay optics comprise means for generating a predefined and/or variable pupil distribution of the light.

20. The microscope of claim 12, wherein the relay optics comprise means for generating a predefined and/or variable field distribution in a Fourier-transformed plane.

* * * * *

UNITED STATES PATENT AND TRADEMARK OFFICE
CERTIFICATE OF CORRECTION

PATENT NO. : 10,254,524 B2
APPLICATION NO. : 15/526704
DATED : April 9, 2019
INVENTOR(S) : Daniel Schwedt et al.

Page 1 of 1

It is certified that error appears in the above-identified patent and that said Letters Patent is hereby corrected as shown below:

On the Title Page

"(73) Assignee: Carl Zeiss Microscopy GmbH, Jena, (DE)"
Should read:
--(73) Assignees: Carl Zeiss Microscopy GmbH, Jena, (DE)
                Carl Zeiss AG, Oberkochen, (DE)--

Signed and Sealed this
Twenty-first Day of January, 2020

Andrei Iancu
*Director of the United States Patent and Trademark Office*